United States Patent
Lin

(10) Patent No.: US 7,459,820 B2
(45) Date of Patent: Dec. 2, 2008

(54) MAGNETIC BELT AND ROLLER SYSTEM

(76) Inventor: Ted T. Lin, 12307 Crayside La., Saratoga, CA (US) 95070

(*) Notice: Subject to any disclaimer, the term of this patent is extended or adjusted under 35 U.S.C. 154(b) by 345 days.

(21) Appl. No.: 11/440,328

(22) Filed: May 24, 2006

(65) Prior Publication Data

US 2007/0273231 A1    Nov. 29, 2007

(51) Int. Cl.
  *H02K 49/00* (2006.01)
  *H02P 15/00* (2006.01)
(52) U.S. Cl. ..................................... 310/103
(58) Field of Classification Search ......... 310/103–105, 310/80; 74/DIG. 4; 464/26; 198/690.1; 417/420
See application file for complete search history.

(56) References Cited

U.S. PATENT DOCUMENTS

| | | |
|---|---|---|
| 3,998,448 A | 12/1976 | Gray et al. |
| 4,068,384 A | 1/1978 | Holy et al. |
| 4,409,872 A | 10/1983 | Bertoldo |
| 4,526,329 A | 7/1985 | Takeda |
| 4,866,321 A | 9/1989 | Blanchard et al. |
| 5,219,273 A | 6/1993 | Chang |
| 5,569,967 A | 10/1996 | Rode |
| 6,101,952 A | 8/2000 | Thornton et al. |
| 6,786,316 B2 | 9/2004 | Jacobson et al. |

*Primary Examiner*—Javaid Nasri
(74) *Attorney, Agent, or Firm*—Schneck & Schneck; Thomas Schneck

(57) ABSTRACT

A belt and roller system comprising a roller having a permanent magnet sandwiched in between a pair of temporarily magnetic disks with the magnetism of the disks induced by the permanent magnet. For example, each temporarily magnetic disk may be steel. Each pole of the permanent magnet is disposed adjacent to a pole of one of the temporarily magnetic disks resulting in a magnetic attraction to a disk at each pole of the permanent magnet. The opposing magnetic poles of the disks form a magnetic flux circuit by which a temporarily magnetic belt, such as a steel belt is guidable to prevent or reduce deviation which it may have from its roller path. Additional permanent magnetic rollers, as described above, or other rollers known in the art may be combined with the magnetic roller of the present invention to form a gear train about which the belt rotates.

17 Claims, 4 Drawing Sheets

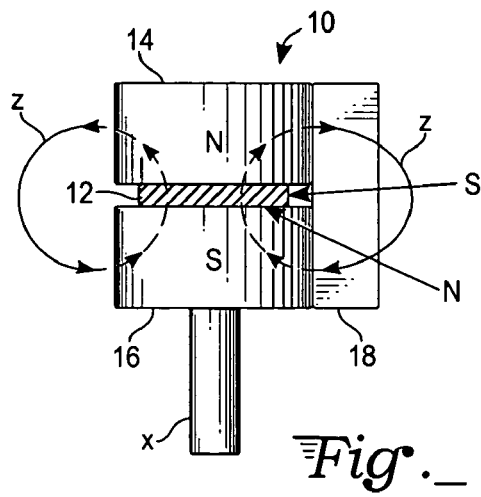
Fig._1
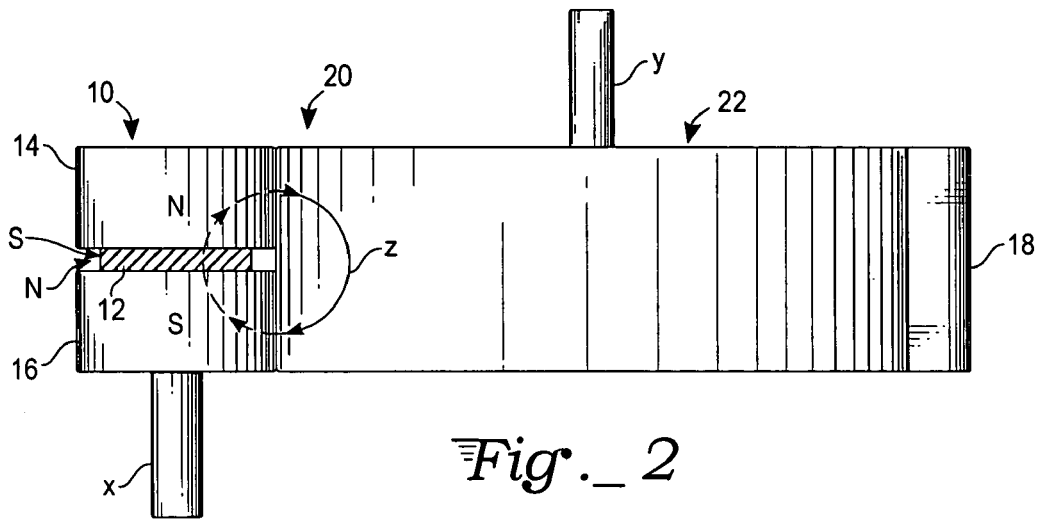
Fig._2
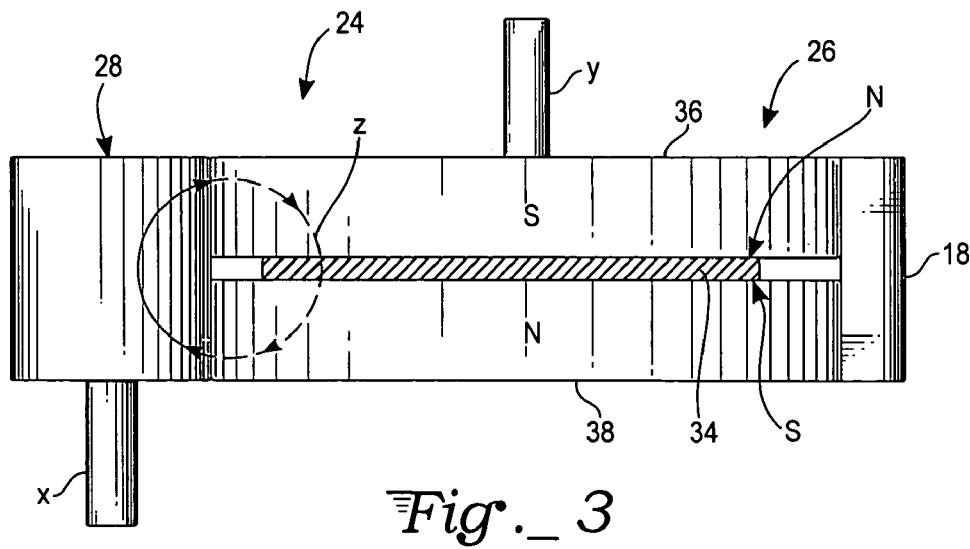
Fig._3

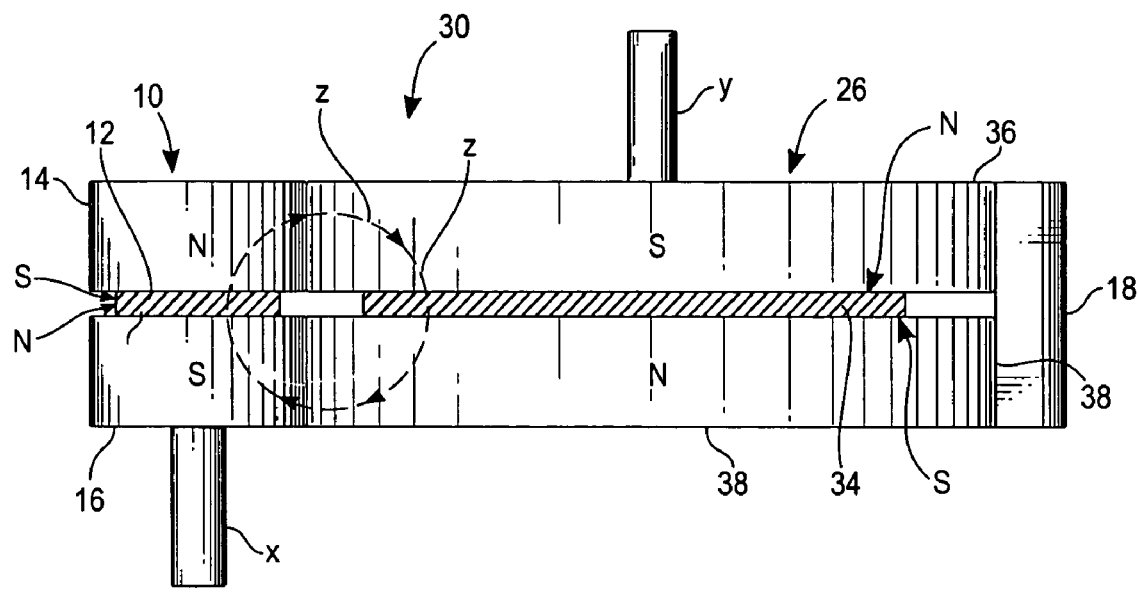
Fig._4
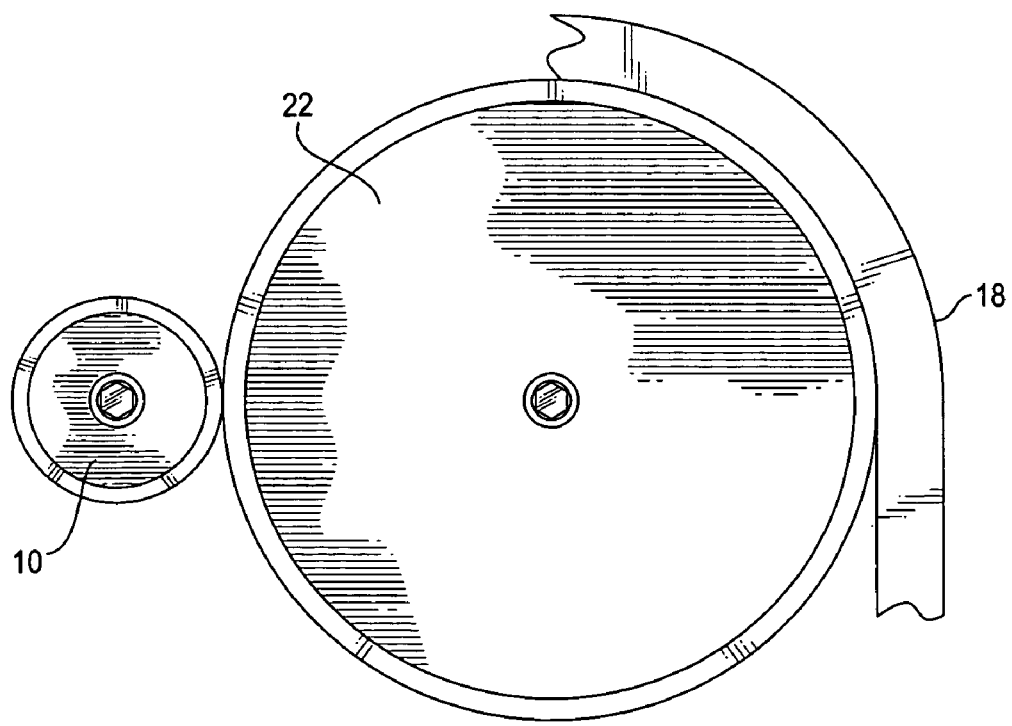
Fig._5

MAGNETIC BELT AND ROLLER SYSTEM

FIELD OF THE INVENTION

The invention relates generally to motion transmission, and, in particular to a mechanical coupling mechanism used in motion transmission.

BACKGROUND OF THE INVENTION

In many driving mechanisms used to impart motion to applications where precise motion control is desired, a belt is used in conjunction with a pulley or roller. Such applications include use of the following apparatuses as well as other precision requiring devices: printers, security cameras, x-y tables, scanners, CNC (computerized, numerically controlled) machines, dispensers, injector pumps, turntables, and optical equipment. In the belt and pulley system, the force is transferred through the friction between belt and pulley. Therefore, belt slippage will occur when the translating force is higher than the friction.

A pulley system incorporating a timing belt does solve some of the slippage problems, however, the timing belt typically requires a particular tension that may lead to degradation of the belt. Also, rubber or elastomer belts generate particles that can contaminate a clean environment.

A gear has commonly been used as a power transmission mechanism in various applications where precise motion control is desired. However, problems associated with gear use include noise, backlash, and weariness.

It is an object of the present invention to provide a new and improved motion transmission system.

It is another object of the present invention to provide a new and improved belt and roller system.

It is an object of the present invention to provide a particle free belt and roller coupling.

It is an object of the present invention to provide a motion transmission mechanism that reduces or eliminates backlash, noise, and/or wear.

SUMMARY OF THE INVENTION

The above and other objects have been achieved with the use of a motion transmission system comprising a rotor having a permanent magnet sandwiched in between a pair of ferromagnetic (magnetizable) or paramagnetic (temporarily magnetic) disks. For example, each temporarily magnetizable disk may be steel. Each pole of the permanent magnet is disposed adjacent to one of the disks such that an opposing polarity is induced in each of the disks. The opposing magnetic poles form a magnetic circuit which allows magnetic flux to circulate from the permanent magnet through the first magnetic disk, outside the first magnetic disk, through the second magnetic disk, and back through the permanent magnet. A ferromagnetic or paramagnetic (temporarily magnetic) belt, such as a steel belt, is guidable by the magnetic circuit about the permanent magnetic pulley such that it does not slip off its pulley path on the disks. The benefit of no slippage is attained by a requirement for more driving force because a full load is always present on the driven member.

One embodiment of the present invention includes a gear train comprising one permanent magnet roller of the present invention engaging a temporarily magnetic roller comprised of a material such as steel. The permanent magnet roller and the temporarily magnetic roller may be of varying sizes. For instance the permanent magnet roller may be smaller or larger than the temporarily magnetic roller. A temporarily magnetic belt can rotate about both the permanent and temporarily magnetic rollers and is guidable by the magnetic circuit to transfer power.

In another embodiment of the present invention, two permanent magnetic rollers are used in a gear train and a temporarily magnetic belt which rotates about both the permanent rollers is guidable by the magnetic circuit.

The radial force required to engage the belt and the roller and to disengage the belt and the roller during pulley rotation is modest. However, the tangential force required to separate the belt from the pulley (slip force) to translate the energy from the driven pulley to the load is high. The tangential force keeps the linear speed synchronized for the belt and pulley during the engagement. In this manner roller shaft angular motion can be very accurately translated to linear belt motion.

The permanent roller and belt system and the various embodiments reduce or eliminate belt slippage and backlash due to the guidance provided by the magnetic circuit. Also, the magnetic composition of the belt reduces or eliminates fatigue problems of the prior art. Thus, the present invention would reduce or eliminate accuracy problems in various applications that use mechanical coupling for providing a precise motion.

BRIEF DESCRIPTION OF THE DRAWINGS

FIG. 1 is a side view of one embodiment of the present invention comprising a permanent magnet roller of the present invention with a temporarily magnetic belt.

FIG. 2 is a side view of another embodiment of the present invention comprising a relatively small permanent magnet roller coupled to a relatively large temporarily magnetic roller.

FIG. 3 is a side view of another embodiment of the present invention comprising a relatively large permanent magnetic roller coupled to a relatively small temporarily magnetic roller.

FIG. 4 is a side view of another embodiment of the present invention comprising a relatively large permanent magnet roller coupled to a relatively small permanent magnet roller.

FIG. 5 is a top view of the gear train of FIG. 2.

DETAILED DESCRIPTION

Figure 6:
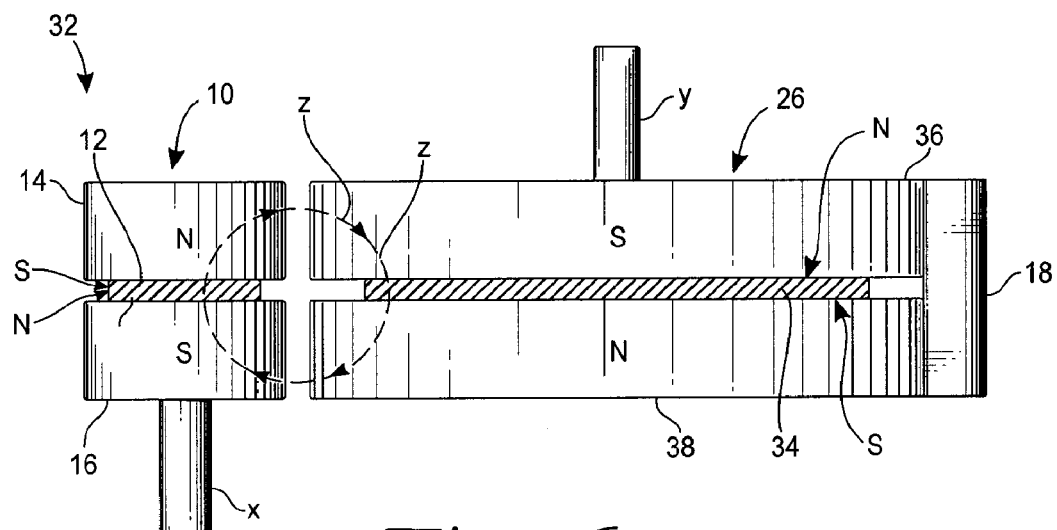
FIG. 6 is a side view of another embodiment of the present invention comprising a relatively large permanent magnet roller coupled in a non-contacting manner to a relatively small permanent magnet roller.

With reference to FIG. 1, there is seen a permanent magnet roller 10 of the present invention. The permanent magnet roller is driven to rotate about the axis of rotation x. The permanent magnet roller features a permanent magnet 12 disposed between a first ferromagnetic (magnetizable) or paramagnetic (temporarily magnetic) disk 14 and a second ferromagnetic or paramagnetic disk 16. A ferromagnetic or paramagnetic material is a material that forms a temporary magnet in the presence of the magnetic field of the permanent magnet. Steel is one example of a ferromagnetic or paramagnetic material used to comprise the disks 14 and 16.

The permanent magnet, in the depicted example, has a diameter less than the diameter of the disks 14 and 16. In other examples, the permanent magnet may comprise any desired shape and may have the same or varying length or width as the disks.

A first pole of the permanent magnet 12 is a south pole and a second opposing pole is a north pole. The south pole of the permanent magnet 12 is disposed proximate to an induced opposing north pole of the first disk 14 and the north pole of the permanent magnet 12 is disposed proximate to an induced opposing south pole of the second disk 16. The induced north and south poles are indicated in the drawings by the letters "N" and "S", respectively. The arrangement of the permanent magnet and its poles in relation to the disks and their poles results in the formation of magnetic flux z represented in the drawing by a circle with arrows.

The magnetic flux z move in a direction to and from the north and south poles and vice versa. The magnetic flux z circulate from the permanent magnet 12 through the first magnetic disk 14, outside the magnetic disk 14, through the second magnetic disk 16, and back through the permanent magnet 12 as indicated by each circle on either side of the magnetic pulley 10. Each circle represents, for example, a torus shape formed by the magnetic flux. The magnetic flux does not appear to pass through the temporarily magnetic belt 18, or temporarily magnetic pulley 22 or 28, described below.

When a magnetic or magnetizable belt 18, as shown in FIG. 5, is disposed about an outer surface of the magnetic roller 10 so that it may rotate about and drive the roller, the magnetic flux z centers or guides the magnetic belt by, for example, magnetically opposing any deviation it may have from its roller path. Therefore, the present invention is advantageous in at least that no or minimal backlash or belt slippage from the roller occurs. The magnetic belt in FIG. 1 is partially disposed about the roller 10 on its roller path. The roller 10 may communicate motion to another magnetic roller 22.

The magnetic belt is a temporarily magnetic belt and may be ferromagnetic or paramagnetic. In one example, the magnetic belt is comprised of steel. Therefore, a further advantage of the present invention is that the belt does not easily wear down due to its material composition. The lack of wear implies a particle free environment as a characteristic of the system.

With reference to FIG. 2, one embodiment of the present invention encompasses a gear train 20. The gear train 20 comprises a relatively small permanent magnet roller 10, formed with a permanent magnet 12 and temporarily magnetic disks 14 and 16, where magnetism is induced (as described with regard to FIG. 1) and a relatively large temporarily magnetic roller 22, such as a steel roller, in rotatable contact with the permanent magnet roller 10. The temporarily magnetic roller 22 may be paramagnetic or ferromagnetic. A temporarily magnetic belt 18 rotates about an outer surface of the permanent magnetic roller 10 and the temporarily magnetic roller 22 and drives both rollers (the gear train). The rollers rotate about parallel rotation axes, x and y, respectively. As with the magnetic roller of FIG. 1, the magnetic flux z centers or guides the magnetic belt by, for example, magnetically opposing any deviation it may have from its pulley path.

With reference to FIG. 3, another embodiment of the present invention encompasses a gear train 24. The gear train comprises a relatively large permanent magnet roller 26, formed with a permanent magnet 34 and temporarily magnetic disks 36 and 38, (as described with regard to FIG. 1) and a relatively small temporarily magnetic roller 28, such as a steel roller, in rotatable contact with the permanent magnetic roller. The temporarily magnetic roller may be paramagnetic or ferromagnetic. The temporarily magnetic belt 18 rotates about an outer surface of the permanent magnetic roller 26 and the temporarily magnetic roller 28 and drives both the rollers (the gear train). The rollers rotate about parallel rotation axes, x and y, respectively. As with the magnetic roller of FIG. 1, the magnetic flux z centers or guides the magnetic belt by, for example, magnetically opposing any deviation it may have from its roller path.

With reference to FIG. 4, another embodiment of the present invention encompasses a gear train 30. The gear train comprises relatively large permanent magnet roller 26 and relatively small permanent magnetic roller 10, in rotatable contact with the relatively large permanent magnetic roller, both formed as described with regard to FIGS. 1 and 3. The temporarily magnetic belt 18 rotates about an outer surface of both permanent magnetic rollers and drives both the rollers (the gear train). The rollers rotate about parallel rotation axes, x and y, respectively. As with the magnetic pulley of FIG. 1, the magnetic flux z centers or guides the magnetic belt by, for example, magnetically opposing any deviation it may have from its roller path.

With reference to FIG. 6, another embodiment of the present invention encompasses a gear train 32. The gear train 32 comprises relatively large permanent magnet roller 26 and relatively small permanent magnetic roller 10, both formed as described with regard to FIGS. 1 and 3. Roller 10 and roller 26 are not in contact with one another thus provide for noise reduction. The temporarily magnetic belt 18 rotates about a portion of the outer surface of both permanent magnetic rollers and drives both the rollers (the gear train). The rollers rotate about parallel rotation axes x and y, respectively. As with the magnetic roller of FIG. 1, the magnetic flux centers or guides the magnetic belt by, for example, magnetically opposing any deviation it may have from its roller path.

The temporarily magnetic belt 18 may also be magnetically attracted to the disks about which it rotates and the permanent magnet disposed therebetween thereby guiding the belt about its roller path.

Figure 7:
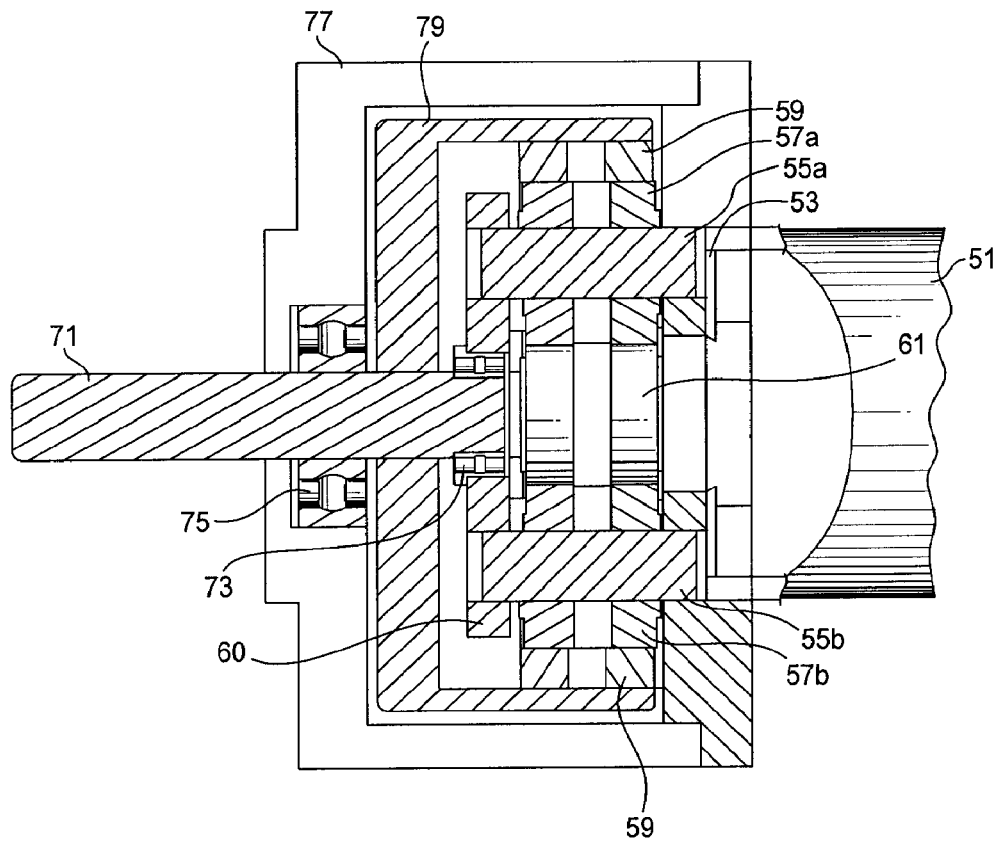
FIG. 7 is a side view of a magnetic roller assembly in accordance with the present invention configured as a shaft speed reducer.

With reference to FIG. 7, an input shaft 51 is connected to support plate 53 that holds one end of outer roller axles 55a, 55b. Each outer roller axle carries an outer roller 57a, 57b, respectively, with each outer roller being constructed as the roller of FIG. 1. The other ends of the outer roller axles are secured in fixed roller retainer plate 60 that allows rotation of the roller axles therein. The outer rollers roll against fixed ring 59 on one side and inner roller 61 on another side, with a transfer of mechanical energy the same as a large gear in relation to a smaller gear. Both the fixed ring and inner roller 61 are made in halves of ferromagnetic or paramagnetic material sandwiching a permanent magnet between halves. The polarity of the halves is opposite to the polarity of the contacting roller halves so that the contacting pieces strongly attract each other, thereby preventing slip or lash. The approximate ratio of the radii of the rotating members, i.e., ratio of the inside radius of support ring 59 to radius of inner roller 61 establishes the motion reduction ratio of input shaft 51 in relation to output shaft 71. Note that output shaft 71, connected to inner roller 61, is supported by inner bearings 73 and outer bearings 75. A fixed outer housing 77 holds a fixed inner housing 79 that in turn, supports a fixed rotor retainer plate 60.

Figure 8:
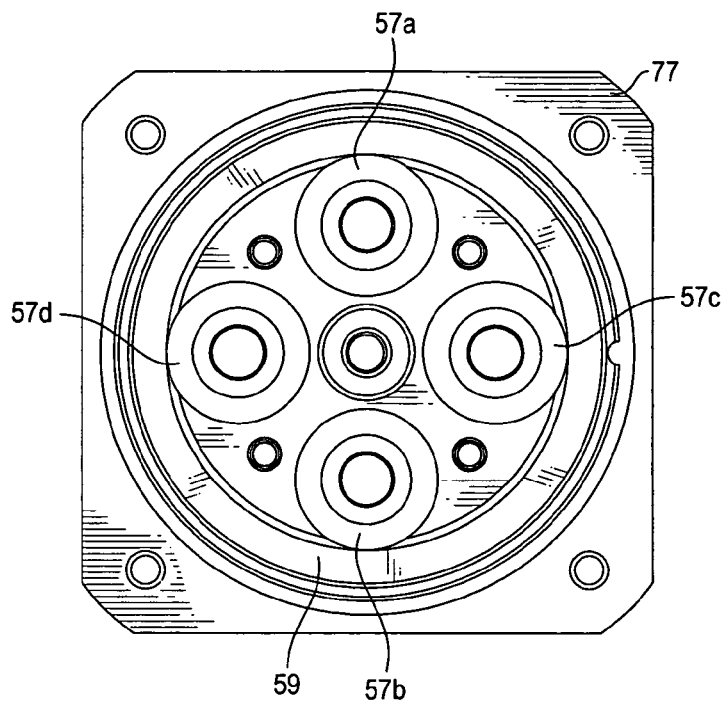
FIGS. 8 and 9 are detailed views of the apparatus of FIG. 7.
Figure 9:
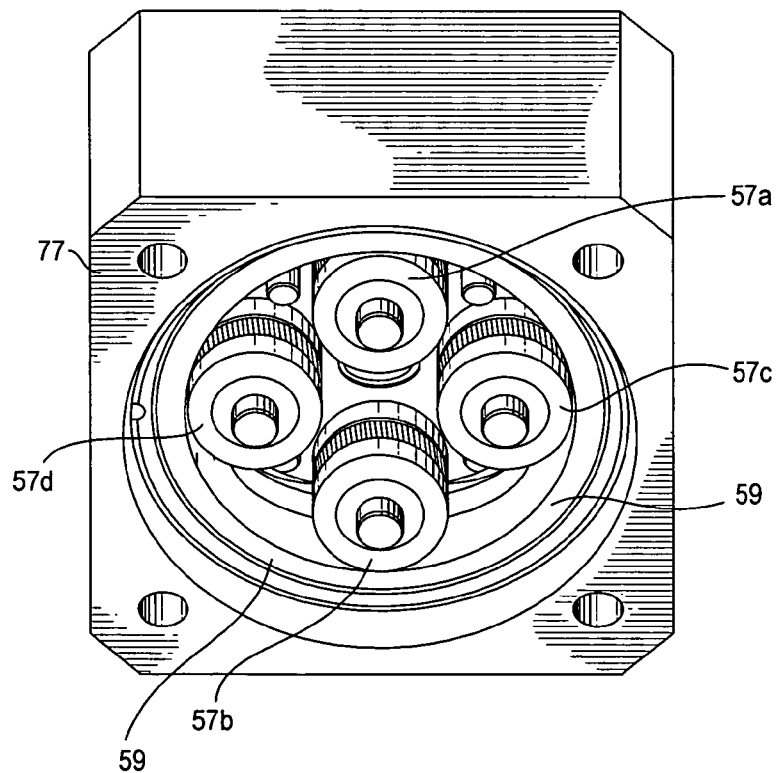

FIGS. 8 and 9 show the rollers 57a, 57b, 57c, and 57d operating in quadrants within and contacting magnetized support ring 59, as in FIG. 7. The four quadrants have rollers that are offset from a neighboring roller by 90 degrees. The inner roller is not shown nor the input nor output shafts. Speed reduction and mechanical advantage increase from the input shaft to the output shaft results from the arrangement shown.

What is claimed is:

1. A belt and roller system comprising:

a first roller comprising first and second temporarily magnetic disks having magnetic poles of opposing magnetic polarity and a permanent magnet disposed between said disks, the permanent magnet having poles of opposing magnetic polarity, each permanent magnet pole proximate to a pole of one of the temporarily magnetic disks that is of an opposing magnetic polarity to it, the opposing magnetic poles forming at least one magnetic circuit allowing magnetic flux to circulate from the permanent magnet through the first temporarily magnetic disk, outside of the first temporarily magnetic disk, through the second temporarily magnetic disk, and back through the permanent magnet; and a temporarily magnetic belt arranged in drive relation to said roller.

2. The belt and roller system of claim 1 wherein said temporarily magnetic disks are ferromagnetic.

3. The belt and roller system of claim 1 wherein said temporarily magnetic disks are paramagnetic.

4. The belt and roller system of claim 1 wherein said temporarily magnetic disks are steel.

5. The belt and roller system of claim 1 wherein said belt and said disks of said roller are magnetizable metal.

6. The belt and roller system of claim 1 further comprising a second roller rotatable about an axis of rotation parallel to an axis of rotation of said first roller.

7. The belt and roller system of claim 6 wherein said second roller is in rotatable contact with said first roller.

8. The belt and roller system of claim 6 wherein said second roller is constructed the same as the first roller but with magnetic poles reversed thereby forming a magnetic circuit.

9. The belt and roller system of claim 6 wherein said second roller comprises a temporarily magnetic roller rotatably driven by said belt.

10. The belt and roller system of claim 9 wherein said temporarily magnet roller is steel.

11. The belt and roller system of claim 9 wherein said temporarily magnetic roller is ferromagnetic.

12. The belt and roller system of claim 9 wherein said temporarily magnetic roller is paramagnetic.

13. The belt and roller system of claim 9 wherein said second roller is relatively smaller than said first roller.

14. The belt and roller system of claim 9 wherein said second roller is relatively larger than said first roller.

15. The belt and roller system of claim 6 wherein said second roller includes a permanent magnet disposed between two temporarily magnetic disks.

16. The belt and roller system of claim 15 wherein said second roller is relatively smaller than said first roller.

17. The belt and roller system of claim 15 wherein said second roller is relatively larger than said first roller.

* * * * *